UNITED STATES PATENT OFFICE.

CHARLES S. VADNER, OF BUTTE, MONTANA.

PROCESS FOR THE RECOVERY OF METALS FROM ORES AND THE LIKE.

1,188,705.

Specification of Letters Patent. Patented June 27, 1916.

No Drawing. Application filed February 14, 1916. Serial No. 78,318.

*To all whom it may concern:*

Be it known that I, CHARLES S. VADNER, a citizen of the United States, and a resident of Butte and county of Silver Bow, State of Montana, have discovered a new and useful Process for the Recovery of Metals from Ores and the like, of which the following is a specification.

It is well known that in various smelting operations, in roasting ores and in various other operations that produce sulfurous gases that a large amount of obnoxious fumes are emitted into the air and that these fumes and gases are a source of annoyance and injury to animal and vegetable life. While the mechanical impurities contained in these fumes can be fairly well arrested by the baghouse system and by the use of long flues and baffles, the sulfurous fumes and gases are but partially arrested or rendered innocuous by them.

One of the objects of my invention then is to utilize these sulfurous fumes and the contained heat and to render them harmless to all forms of life.

Another object of my invention is to provide an effective and inexpensive method of recovering metals from mineral matters and the like.

To accomplish these objects I make use of the heat and sulfurous gases contained in fumes, subjecting oxids, carbonates and sufficiently roasted ores containing copper, iron, zinc, lead, arsenic, antimony, cadmium lime, bismuth and manganese, in the presence of a sufficient quantity of water, to the action of these sulfurous gases. By this means these metals are extracted and recovered from the ores and the fumes arrested and rendered harmless.

It will be understood that if desirable in cases where smelter fumes are not available, sulfur can be burnt in order to provide the necessary sulfurous gases for the reduction of ore.

Oxids, carbonates or sufficiently roasted ores are ground to the proper size and showered or sprayed in water down through the first of a series of solution towers. These towers are of suitable size and height according to the quantity of ore to be treated and the length of time the ore requires to be exposed. The sulfurous fumes are led into these solution towers and mingled with the sprayed ore pulp. By means of this spraying, every particle of ore is subjected to the action of the sulfurous gases, which, in the presence of water, effects the solution of the copper and zinc, some of the iron and arsenic and other metals contained as aforesaid in the ore. This solution falls to the sump at the bottom of the tower while the unused gases pass on to the next tower. These towers are interposed between the points in the flues where the sulfurous gases are all united and the point from which they are finally voided. The sulfurous fumes are drawn either by natural or artificial draft from the main flue in the base of the first tower and by a suitable flue led down into the base of a second tower, thence up through the tower and down again to the base of the third tower and so on throughout the series of towers and finally out of the stack. In each tower the fumes come in contact with the sprayed ore pulp so that the sulfurous gases may have a chance to unite with the metals and fall to the sump at the bottom. As many towers can be interposed in the path of the sulfurous fumes as may be found necessary in order to expose sufficient ore requisitely long to take from the fumes all the sulfurous gases and render them harmless enough to be voided into the air. Where the smelter stack is built on an elevation with the flues leading thereto and with towers interposed in succession in the path of the flues, the sprayed ore pulp can be fed again to the successive towers by gravity, otherwise it can be drawn up by pumps.

The solution towers are built over sumps into which the solution of ore and dissolved sulfurous vapors and undissolved ore falls. If the settled and undissolved portion of the ore is found to contain sufficient values it is removed from the sump and sent to the smelter, where on account of the lead, iron, gold, and silver it is very desirable. If the solution is found to contain copper, it is now passed in any suitable manner over metallic iron and the copper in the solution is precipitated and settles to the bottom, when it may be withdrawn and purified and so become a marketable product. Air under pressure is forced through the solution in this tank and the excess of sulfurous gas is thereby blown out of the solution. When the ore coming from the solution has only a faint odor, or none at all of sulfurous gas, further air treatment is stopped. If the solution is found to contain copper it is now passed in any suitable manner over metallic iron. The iron displaces copper in the solution and the copper settles to the bottom whence it may be withdrawn and purified and so become a marketable product. Instead of the use of the metallic iron the sealed cover may be removed and the copper recovered by any suitable electrolytic method. After the copper is removed the solution is then oxidized with oxygen, chlorin gas or any other suitable oxidizing agent until all of the iron contained in the solution is in the ferric condition. The oxidized solution is now cooled and treated in the cold. Finely ground calcium carbonate is now added to the solution until further addition of the same causes no effervescence. By this means the whole of the iron is precipitated as ferric hydrate which will react with any arsenic present to precipitate the same along with any copper, cadmium and bismuth that may have escaped previous precipitation. The solution is now allowed to settle and the sediment drawn off, washed and filter pressed and if found to be of any use for its iron contents is sent to the smelter, or worked up if desired, for its other metallic contents, or if valueless thrown away. The clear solution is now treated with live steam and finely ground calcium carbonate until the solution becomes neutral and the zinc in the course of two or four hours' treatment is all precipitated in the form of carbonates together with some lime. The solution is settled and decanted. The precipitate is washed and decanted and drawn off on to a draining floor and dried, when the zinc can be recovered by any suitable method. By effecting a solution of said carbonate of zinc by exposing same to the action of sulfurous gases in any of the purification towers, the precipitated carbonate of zinc may be dissolved and the solution drawn off in to any suitable treatment tank and the excess of sulfurous gases blown out by air. The solution may be then electrolyzed by any suitable means and the zinc recovered as metallic zinc. As manganese ores are seldom found in a state of purity, but most commonly along with other metals such as in the zinc ores of the Butte district, Montana, and also in the oxidized copper ore of the Bullwhacker mine at Butte, it becomes quite evident that a separation of the metallic contents of such ores must be effected for metallurgical reasons and for financial ones as well, as in this case each metal recovered contributes its metallic value toward the cost of extraction, and whereas an ore may not prove profitable for the extraction of the major metal that it contains, the simultaneous recovery of other metals contained therein, may not preclude it from becoming a profitable operation; whence, the separation of various metals as above outlined is imperative. The solution free from interfering metals is treated in an agitating tank fitted with mechanical stirrers, with an alkali preferably with the oxid, hydrate, carbonates of the alkalis as well as alkaline earths, the above described compounds can be used in part, singly and collectively, likewise compounds of any metal and metals can be used, that will produce the desired effect: an excess of the effective precipitant can be used: the solution is maintained at 55 degrees centigrade and air is passed through same, the manganese is precipitated, the precipitate is washed and separated in the usual manner. Though reasonably pure and fit for many uses in the arts as precipitated and separated as above, the precipitated manganese, likewise ore of manganese containing no interfering and objectionable bases, are dissolved by $SO_2$ gas in the presence of sufficient moisture and subjected to electrolysis in suitable cells and the manganese recovered as peroxid—$MnO_2$.

The peroxid of manganese, whether natural or artificial is a splendid conductor of electricity and has a strong tendency to become electro-negative in contact with a metal; it can easily and almost completely be recovered from a comparatively weak solution by a low voltage current. In electrolyzing a solution excess of acidity is removed by neutralizing at will with a compound and compounds of metal and metals, capable of effecting such a neutralization.

Having described my invention, what I desire to secure by Letters-Patent is:—

1. The process which consists in recovering manganese and other metals from naturally oxidized or sufficiently roasted sulfid ores containing manganese and other metals by spraying the finely ground pulp of said ores into sulfurous fumes containing sulfurous gases, oxidizing the solution and ridding the solution of other metals contained therein by precipitating same from the cold solution by means of a sufficient quantity of finely pulverized calcium carbonate and recovering the manganese.

2. The process which consists in recovering manganese and other metals from naturally oxidized or sufficiently roasted sulfid ores containing manganese and other metals by spraying the finely ground pulp of said ores into sulfurous fumes containing sulfurous gases, oxidizing the solution and ridding the solution of other metals contained therein by precipitating same from the cold solution by means of a sufficient quantity of finely pulverized carbonate of manganese that can precipitate other metals, heating the solution and adding sufficient additional finely pulverized reagent that can precipitate the remaining metals except manganese and recovering the manganese.

3. The process which consists in recovering manganese and other metals from naturally oxidized or sufficiently roasted sulfid ores containing manganese and other metals by spraying the finely ground pulp of said ores into sulfurous fumes containing sulfurous gases, oxidizing the solution and ridding the solution of other metals contained therein by precipitating same from the cold solution by means of a sufficient quantity of a finely pulverized carbonate of metals that can precipitate other metals, heating the solution and adding sufficient additional finely pulverized carbonate of metals that can precipitate the remaining metals except manganese, eliminating same, adding an alkali that in the presence of heat and air precipitates the manganese.

4. The process which consists in recovering manganese and other metals from naturally oxidized or sufficiently roasted sulfid ores containing manganese and other metals by spraying the finely ground pulp of said ores into sulfurous fumes containing sulfurous gases, oxidizing the solution and ridding the solution of other metals contained therein by precipitating same from the cold solution by means of a sufficient quantity of a finely pulverized reagent that can precipitate other metals, heating the solution and adding sufficient additional finely pulverized reagent that can precipitate the remaining metals except manganese, eliminating same, adding a reagent that in the presence of heat and air precipitates the manganese, dissolving the precipitated manganese in sulfur dioxid gas and water and electrolyzing the solution whereby the manganese is recovered as peroxid.

5. The process which consists in recovering manganese and other metals from naturally oxidized or sufficiently roasted sulfid ores containing manganese and other metals by spraying the finely ground pulp of said ores into sulfurous fumes containing sulfurous gases, oxidizing the solution and ridding the solution of other metals contained therein by precipitating same from the cold solution by means of a sufficient quantity of finely pulverized calcium carbonate heating the solution with additional finely pulverized carbonate sufficient to precipitate the zinc; eliminating same precipitating the manganese with lime in the presence of heat and air.

6. The process which consists in recovering manganese and other metals from naturally oxidized or sufficiently roasted sulfid ores containing manganese and other metals by spraying the finely ground pulp of said ores into sulfurous fumes containing sulfurous gases, oxidizing the solution, treating same in the cold with finely pulverized calcium carbonate, whereby ferric hydrate is precipitated which reacts with any arsenic present eliminating same as ferric arsenite, heating the solution, precipitating the zinc as a carbonate with calcium carbonate, eliminating the precipitated zinc, precipitating the manganese with lime in the presence of heat and air, dissolving the manganese compound in $SO_2$ gas and water and electrolyzing the solution thus recovering the manganese.

7. The process which consists in recovering manganese and other metals from naturally oxidized or sufficiently roasted sulfid ores containing manganese and other metals by spraying the finely ground pulp of said ores into sulfurous fumes containing sulfurous gases, eliminating any copper contained therein by passing the solution over metallic iron, oxidizing and treating the solution in the cold with finely pulverized calcium carbonate whereby the ferric hydrate formed reacts with the arsenic and eliminates same from the solution as ferric arsenite and recovering the manganese.

8. The process which consists in recovering manganese and other metals from naturally oxidized or sufficiently roasted sulfid ores containing manganese and other metals by spraying the finely ground pulp of said ores into sulfurous fumes containing sulfurous gases, eliminating any copper contained therein by passing the solution over metallic iron, oxidizing and treating the solution in the cold with finely pulverized calcium carbonate whereby the ferric hydrate formed reacts with the arsenic and eliminates same from the solution as ferric arsenate.

9. The process which consists in recovering manganese and other metals from naturally oxidized or sufficiently roasted sulfid ores containing manganese and other metals by spraying the finely ground pulp of said ores into sulfurous fumes containing sulfurous gases, suitably eliminating any copper, oxidizing and treating the solution in the cold with calcium carbonate whereby other metals excepting zinc and manganese are precipitated, and ferric hydrate may be formed and reacts with any arsenic present, precipitating same, eliminating such precipitate, heating the solution, precipitating the zinc with lime rock, eliminating the precipitated zinc, treating the solution with lime in the presence of heat and air thereby precipitating manganese, dissolving the precipitated manganese in $SO_2$ gas and water and recovering the manganese as peroxid.

10. The process of recovering manganese from an acid sulfite solution which consists in electrolyzing the solution for the recovery of the manganese as peroxid and elimination of $SO_2$ gas.

11. The process of recovering manganese from an acid sulfite solution which consists in electrolyzing the solution and neutralizing the acid as fast as formed.

12. The process of recovering manganese from an acid sulfite solution which consists in electrolyzing the solution and partially neutralizing with a reagent that can partially neutralize the acid that may be formed and continuously electrolyzing for the recovery of the manganese and elimination of the $SO_2$ gas.

13. The process of recovering manganese from an acid sulfite solution which consists in electrolyzing the solution, partially neutralizing the solution with the carbonate of a metal and continuously electrolyzing for the recovery of the manganese and elimination of $SO_2$ gas.

14. The process of recovering manganese from an acid sulfite solution which consists in electrolyzing the solution, meanwhile partially neutralizing the solution during the progress of the electrolysis with a carbonate of manganese and continuously electrolyzing the solution for the recovery of the manganese.

15. The process of recovering manganese from an acid sulfite solution consisting in electrolyzing the solution, meanwhile partially neutralizing any acid that may be formed with compounds of lime and manganese and continuously electrolyzing the solution for the recovery of the manganese and elimination of the $SO_2$ gas.

In witness whereof, I have hereunto set my hand in the presence of two subscribing witnesses.

CHARLES S. VADNER.

Witnesses:
EMMETT H. O'BRIEN,
GEO. A. ULOTZ.